United States Patent
Dix et al.

(10) Patent No.: US 9,242,632 B2
(45) Date of Patent: Jan. 26, 2016

(54) METHOD OF CALIBRATION OF A PARK BRAKE OF A CONTINUOUSLY VARIABLE TRANSMISSION

(75) Inventors: Peter J. Dix, Naperville, IL (US); Garth H. Bulgrien, Ephrata, PA (US); Robert C Prasse, Chicago, IL (US); Pavel Kuros, Wood Dale, IL (US)

(73) Assignee: CNH Industrial America LLC, New Holland, PA (US)

( * ) Notice: Subject to any disclaimer, the term of this patent is extended or adjusted under 35 U.S.C. 154(b) by 147 days.

(21) Appl. No.: 14/240,637

(22) PCT Filed: Aug. 27, 2012

(86) PCT No.: PCT/US2012/052571
§ 371 (c)(1),
(2), (4) Date: Feb. 24, 2014

(87) PCT Pub. No.: WO2013/029056
PCT Pub. Date: Feb. 28, 2013

(65) Prior Publication Data
US 2014/0200114 A1    Jul. 17, 2014

Related U.S. Application Data

(60) Provisional application No. 61/527,530, filed on Aug. 25, 2011.

(51) Int. Cl.
| | |
|---|---|
| *B60W 10/10* | (2012.01) |
| *B60W 10/196* | (2012.01) |
| *B60T 1/06* | (2006.01) |
| *B60T 17/22* | (2006.01) |
| *B60W 10/101* | (2012.01) |

(52) U.S. Cl.
CPC .............. *B60W 10/196* (2013.01); *B60T 1/062* (2013.01); *B60T 17/221* (2013.01); *B60W 10/101* (2013.01); *Y10T 477/644* (2015.01)

(58) Field of Classification Search
None
See application file for complete search history.

(56) References Cited

U.S. PATENT DOCUMENTS

| | | |
|---|---|---|
| 2,097,436 A | 11/1937 | Bennetch |
| 3,810,531 A | 5/1974 | Edmunds |
| 4,055,047 A | 10/1977 | Hara |
| 4,102,222 A | 7/1978 | Miller et al. |
| 4,167,855 A | 9/1979 | Knapp |
| 4,310,078 A | 1/1982 | Shore |
| 4,489,552 A | 12/1984 | Watanabe et al. |
| 4,530,416 A | 7/1985 | Kassai |
| 4,543,786 A | 10/1985 | Shuler |
| 4,653,350 A | 3/1987 | Downs et al. |
| 4,759,185 A | 7/1988 | McConnell et al. |
| 4,811,225 A | 3/1989 | Petzold et al. |

(Continued)

*Primary Examiner* — Dirk Wright
(74) *Attorney, Agent, or Firm* — Sue C. Watson

(57) ABSTRACT

A method of calibrating a hydraulically operated park brake of a continuously variable transmission of a vehicle. With the vehicle moving at a set, slow speed within a specified range, and the park brake off, a search technique is used, wherein the brake hydraulic pressure is reduced by application of a control signal of a selected test value to apply the brake. When the selected test value is reached, it is held constant, and a condition in a HSU of the transmission is monitored for a change indicative of engagement of the park brake. This will expectedly be in the form of a pressure change and more particularly an increase indicating initial contact between the plates of the brake, and if the HSU change is not detected, the step will time out and another control signal value will be tested.

10 Claims, 5 Drawing Sheets

(56) References Cited

U.S. PATENT DOCUMENTS

| | | | |
|---|---|---|---|
| 5,184,466 A | 2/1993 | Schniederjan et al. | |
| 5,406,793 A | 4/1995 | Maruyama et al. | |
| 5,449,329 A | 9/1995 | Brandon et al. | |
| 5,467,854 A | 11/1995 | Creger et al. | |
| 5,468,198 A | 11/1995 | Holbrook et al. | |
| 5,531,304 A | 7/1996 | Ishin et al. | |
| 5,540,051 A | 7/1996 | Maruyama et al. | |
| 5,573,473 A | 11/1996 | Asayama et al. | |
| 5,580,332 A | 12/1996 | Mitchell et al. | |
| 5,671,137 A | 9/1997 | Ishin et al. | |
| 5,684,694 A | 11/1997 | Ishin et al. | |
| 5,980,411 A | 11/1999 | Wontner | |
| 6,080,074 A | 6/2000 | Ulbrich et al. | |
| 6,088,645 A | 7/2000 | Kawasaki et al. | |
| 6,115,661 A | 9/2000 | Hosseini et al. | |
| 6,213,259 B1 * | 4/2001 | Hanson et al. | 188/156 |
| 6,250,077 B1 | 6/2001 | Iino et al. | |
| 6,285,942 B1 | 9/2001 | Steinmetz et al. | |
| 6,292,732 B1 | 9/2001 | Steinmetz et al. | |
| 6,295,497 B1 | 9/2001 | Kuras | |
| 6,332,860 B1 | 12/2001 | Hubbard et al. | |
| 6,442,934 B1 | 9/2002 | Okuda et al. | |
| 6,481,314 B2 | 11/2002 | Nemoto et al. | |
| 6,524,205 B1 | 2/2003 | Irikura et al. | |
| 6,616,559 B1 | 9/2003 | Hon et al. | |
| 6,672,990 B2 | 1/2004 | Netzer | |
| 6,832,978 B2 | 12/2004 | Buchanan et al. | |
| 7,011,188 B2 * | 3/2006 | Scheuring, III et al. | 188/2 D |
| 7,037,236 B2 | 5/2006 | Ishibashi et al. | |
| 7,063,638 B2 | 6/2006 | Weeramantry | |
| 7,082,757 B2 | 8/2006 | Teslak et al. | |
| 7,147,239 B2 | 12/2006 | Teslak et al. | |
| 7,278,953 B2 | 10/2007 | Meyer et al. | |
| 7,549,287 B2 | 6/2009 | Foster et al. | |
| 8,634,995 B2 * | 1/2014 | Deurloo et al. | 701/51 |
| 8,814,752 B2 * | 8/2014 | Kitaori et al. | 477/99 |
| 9,073,529 B2 * | 7/2015 | Koons et al. | 1/1 |
| 2008/0139363 A1 | 6/2008 | Williams | |
| 2008/0242464 A1 | 10/2008 | Kumazaki et al. | |

* cited by examiner

METHOD OF CALIBRATION OF A PARK BRAKE OF A CONTINUOUSLY VARIABLE TRANSMISSION

This application claims the benefit of U.S. Provisional Application No. 61/527,530, filed Aug. 25, 2011.

TECHNICAL FIELD

This invention relates generally to calibration of a park brake of a CVT and more particularly to calibration by monitoring pressure changes between a hydrostatic pump and motor of the transmission to determine initial disengagement or release of the brake.

BACKGROUND ART

The disclosure of U.S. Provisional Application No. 61/527,530, filed Aug. 25, 2011, is hereby incorporated herein in its entirety by reference.

Transmissions with hydraulically operated park brakes need to consistently operate such that the timing of brake engagement and disengagement can be controlled precisely. This can be difficult, since the brakes are mechanically applied by springs, the brakes typically have multiple plates, and there is variation between springs and other component tolerances, such that the pressure needed to move the piston to the point at which the plates touch and the brake begins to engage and effect torque transmission can vary quite a bit.

Most transmissions up to now in tractors have been power shift. Continuously variable transmissions or CVTs are becoming more popular and have significantly different architectures, often using a hydrostatic pump and motor. The pressure between the pump and motor is a direct indication of the torque through the hydrostatic unit, and in turn an indication of the torque absorbed, and the effect on torque transmission, by the park brake. In some designs, the hydraulic pump and motor can be in separate housings, connected with tubes or hoses, but they may be in the same housing (a hydrostatic unit or HSU), which typically increases efficiency.

Typically, known electronically controlled transmissions with clutches use a calibration routine. A searching method is used to determine the current needed to provide the pressure to just start to engage the clutch. This point is usually determined by when the engine speed reduces or engine torque changes, indicating that the clutch is beginning to engage. However, a shortcoming with this approach is that engine speed can vary as a result of other reasons, such as when other loads on the engine change, such as hydraulic or PTO loads, and various drags on the engine vary and such. Also, tractor engines have a governor that is quite complex, and may change engine speeds due to complex algorithms to manage emissions, efficiency and other factors. As a result, how much the engine speed dips cannot always be a direct indication of the level of torque on a park brake, which can result in different calibration values. Park brake calibration done using engine torque would have similar shortcomings. A torque sensor could also be used for calibration, but such torque sensors are expensive and add complexity. Optionally, adding another torque sensor might be one costly option. Also, engine torque could be estimated from fuel consumption, but this would be a slower signal, and again subject to other loads on the engine.

Thus, what is sought is a manner of hydraulic park brake calibration that does not rely on engine speed, torque or separate torque sensors, and overcomes one or more of the shortcomings set forth above.

SUMMARY OF THE INVENTION

What is disclosed is a manner of hydraulic park brake calibration of a continuously variable transmission that does not rely on engine speed or engine torque, and overcomes one or more of the shortcomings set forth above.

According to a preferred aspect of the invention, movement of the vehicle at a set, slow speed is used by engagement of certain clutches of the transmission. The clutches used are preferably selected to provide higher HSU pressures, and the ground speed will remain within a specified range during the calibration or the calibration will terminate. A search technique is used, wherein a control signal, e.g., in the form of an electrical current value translated to a pressure value in a pressure reducing valve, is applied to the park brake to reduce the hydraulic brake pressure to apply the brake, since it is spring applied. When the selected hydraulic test pressure is reached, it is held constant, and a condition in the HSU is monitored for a change indicative of engagement of the park brake. This will expectedly be in the form of a pressure change, and more particularly, a pressure increase indicative of the "kiss point", wherein contact between the plates of the brake first occurs. If the expected pressure increase is not detected, the step will time out and a signal value for another hydraulic brake pressure will be selected and tested.

After each pressure is tested, the brake is released again, to ensure that each step is the same as when the brake will actually be used. A "divide and conquer" approach is used. This entails only reducing the brake pressure test value when the detected HSU pressure has increased. This refers to a search routine that divides the search area in half each time it picks a new "guess" or current value.

According to another preferred aspect of the invention, pressure sensors in lines of the HSU between the pump and motor, or differential pressure transducer in ports between the pump and motor, will be used as an indication of driveline torque from brake engagement. A baseline pressure difference is recorded just prior to the park brake calibration or at each test pressure, since there typically will be some pressure difference, even with the driveline disengaged.

DETAILED DESCRIPTION OF THE INVENTION

Figure 4:
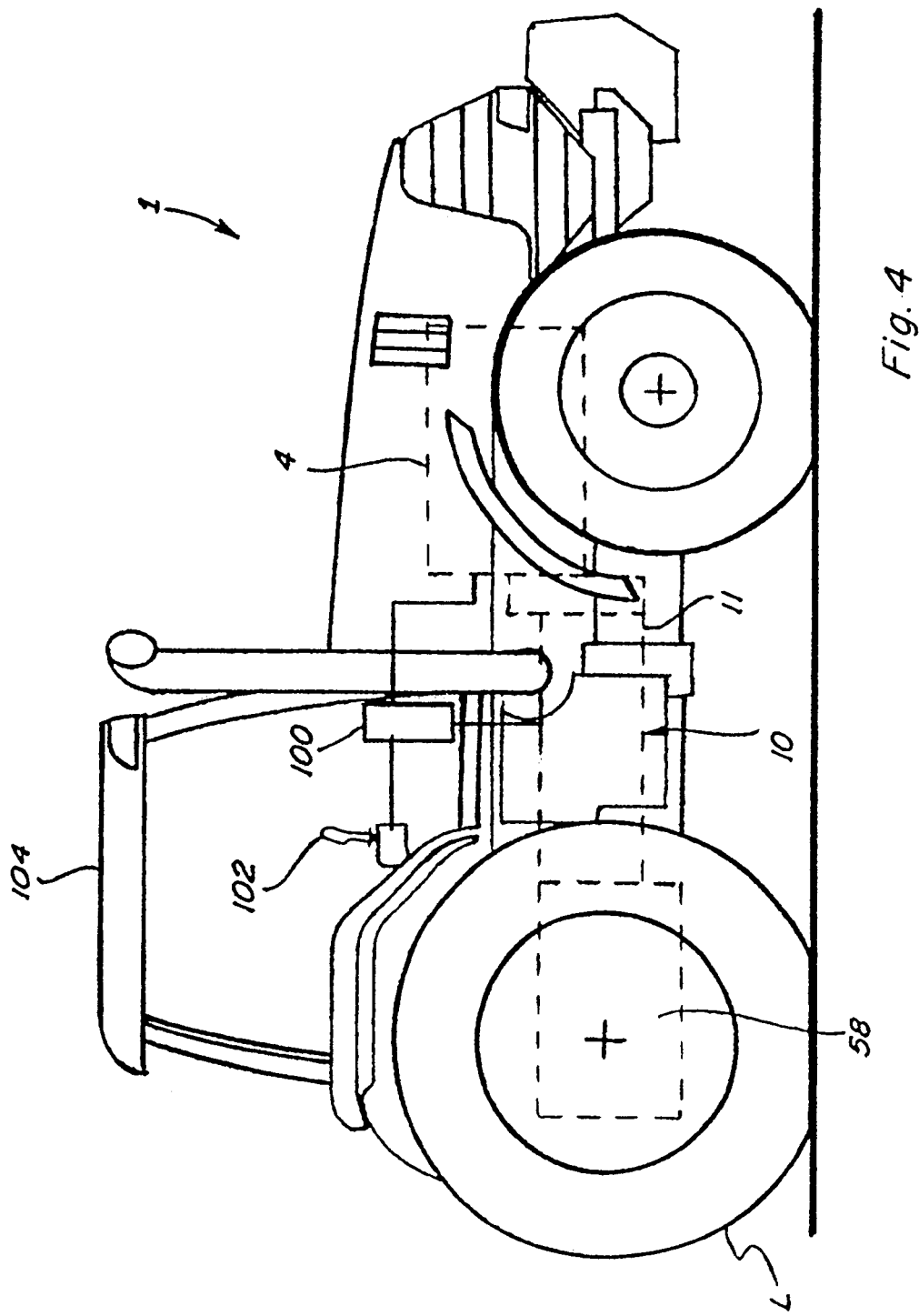
FIG. 4 is a simplified side view of a vehicle for use with the method of the invention.

Referring now to the drawings, in FIG. 4 a representative vehicle which is a work machine 1 is shown, which is a tractor representative of those that can be used for a variety of uses, including, but not limited to, agriculture, construction, earth moving and forestry. Work machine 1 includes a power source 4 which will be, for instance, an internal combustion engine, and is mechanically coupled to a continuously variable hydro-mechanical transmission, a representative embodiment 10 of which is shown schematically in FIG. 1.

Transmission 10 is automatically operable via controlling swash plate angle, as will be explained.

Figure 1:
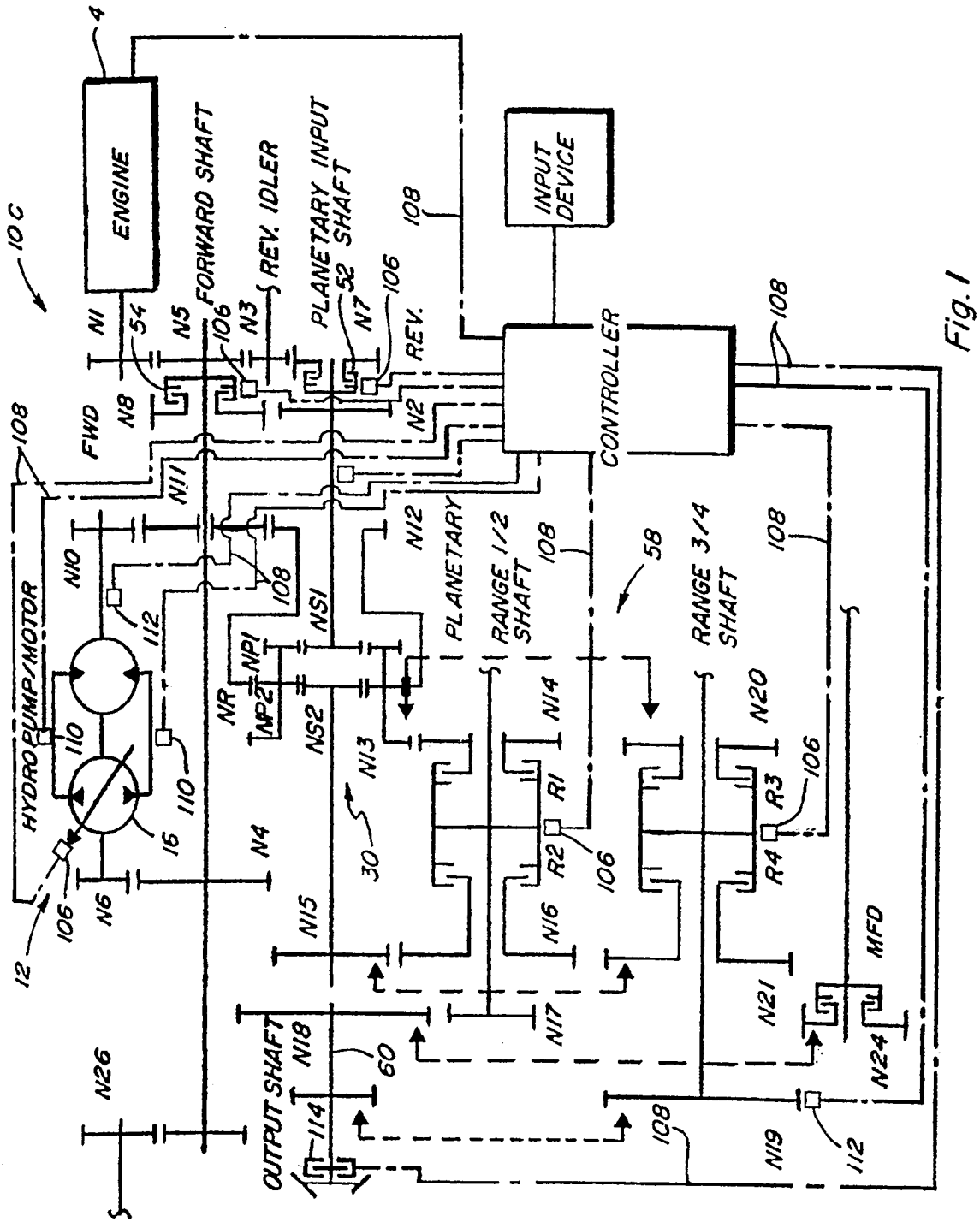
FIG. 1 is a simplified schematic representation of a CVT for use with the method of the invention.

Referring also to FIG. 1, transmission 10 is contained in a transmission housing 11 and includes a hydrostatic power unit 12 and a planetary power unit 30 which are coupled to a driveline including a range gear set 58 mounted within transmission housing 11 and coupled to a load L which here is the drive wheels of machine 1 as shown in FIG. 4. It should be understood that machine 1 can alternatively include a load L that comprises a track drive, or an operating system of the machine such as but not limited to, a power take off (PTO).

Hydrostatic power unit 12 of transmission 10 includes a fluid pump 16 coupled by fluid conduits 17 in a closed loop to a fluid motor 18. Motor 18 is coupled to power source 4 via an input gear N6 and having an output gear N10. The power to the hydrostatic power unit 12 is provided by a driven gear N4 mounted on the forward shaft and engaged with gear N6. Output gear N10 is connected to ring gear NR of planetary power unit 30 via gears N11 and N12.

Machine 1 includes a processor based controller 100 in connection with an input device 102 located preferably in operator cab 104 of machine 1, via a suitable communications path 108, to adjust the angle of a swash plate of pump 16, denoted by the term "SPA", for controlling operation of the transmission. As an exemplary embodiment, pump 16 can be an electronically controlled variable displacement hydraulic pump of well known construction.

Planetary power unit 30 includes a primary sun gear NS1 on a planetary input shaft 32 connectable with power source 4 via a forward directional clutch 54 or a reverse directional clutch 52. Power unit 30 is selectively coupled to the load L, coupled to the hydrostatic power unit 12 and selectively coupled to the power source 4, under automatic control of controller 100. For connection to the load L, the hydro-mechanical transmission 10 includes an output shaft 60 coupled to the load L which carries an input gear N18 engaged with an output gear N17 on a range ½ shaft of range gear set 58, and a gear N22 engaged with a gear N19 on a range ¾ shaft. The range ½ shaft can be coupled to planetary power unit 30 via automatic operation of range selectors or clutches R1 and R2 for power flow through gears N13 and N14, or N15 and N16, respectively. The range ¾ shaft can be coupled to unit 30 via range selectors or clutches R3 and R4 for power flow via gears N13 and N20, or N15 and N21. Range ½ shaft and range ¾ shaft can also be simultaneously coupled to power unit 30, to provide dual power flow.

The control of the various clutches will be automatically controlled by controller 100, using actuators 106 connected to controller 100 via suitable conductive paths 108. Transmission 10 also includes appropriate sensors, including pressure sensors 110 for sensing pressure conditions in conduits 17 connecting pump 16 and motor 18, and speed sensors 112 for sensing speeds of load shaft 60, all connected to controller 100 via conductive paths 108. Controller 100 is also connected to engine 4 for receiving speed and other information therefrom. As an alternative to separate sensors 110, item 110 can represent a differential pressure transducer in connection with ports in communication with the two sides of the fluid loop between the pump and motor of unit 12.

In operation, the continuously variable hydro-mechanical transmission 10 can be operated to have a combined hydrostatic and mechanical power flow by engaging the reverse clutch 52 to power planetary power unit 30 via gears N1, N3, N5 and N7, or engaging forward clutch 54 to power it via gears N1, N8, and N2. It is also possible to operate transmission 10 for a pure hydrostatic power flow by disengaging both clutches 52 and 54, and engaging two range clutches. Typically, the R1 and R2 range clutches, and the R1 and R4 clutches.

As a result, with transmission 10, there is no selection for a work range or road range per se. However, the transmission provides a seamless transition between ranges to provide work/road configurations as desired. Speed change from zero to maximum speed is achieved in a smooth and continuous manner by changing the SPA of the pump 16 under control of controller 100. For each speed range, substantially the full range of travel of the swash plate is used. That is, the swash plate will be at one end of the range its travel for minimum speed within the range, it will be at the other end for maximum speed in that range, and the zero tilt or neutral position of the swash plate will be an intermediate position for the speed range, not the zero speed position as it is for some other transmissions. This presents a challenge for execution of some transmission commands that require a change of state wherein the swash plate will have to be tilted to a position significantly different from the present position. And, the direction of power flow through the hydrostatic power unit will often reverse during these range changes.

Transmission 10 includes a park brake 114 in connection with load shaft 60, which is utilized for enabling shuttle shifts and other operations. Park brake 114 is connected to controller 100 via a suitable conductive path 108 for automatic operative control thereby, including to proportionally or gradually engage or apply, and disengage or release, under certain conditions. In this regard, the preferred manner of control of park brake 114 is by a variable electrical signal whereby the controller 100 outputs a park brake control signal having a particular current value, and it is the value of this signal that is desired to be calibrated according to the present application.

Figure 5:
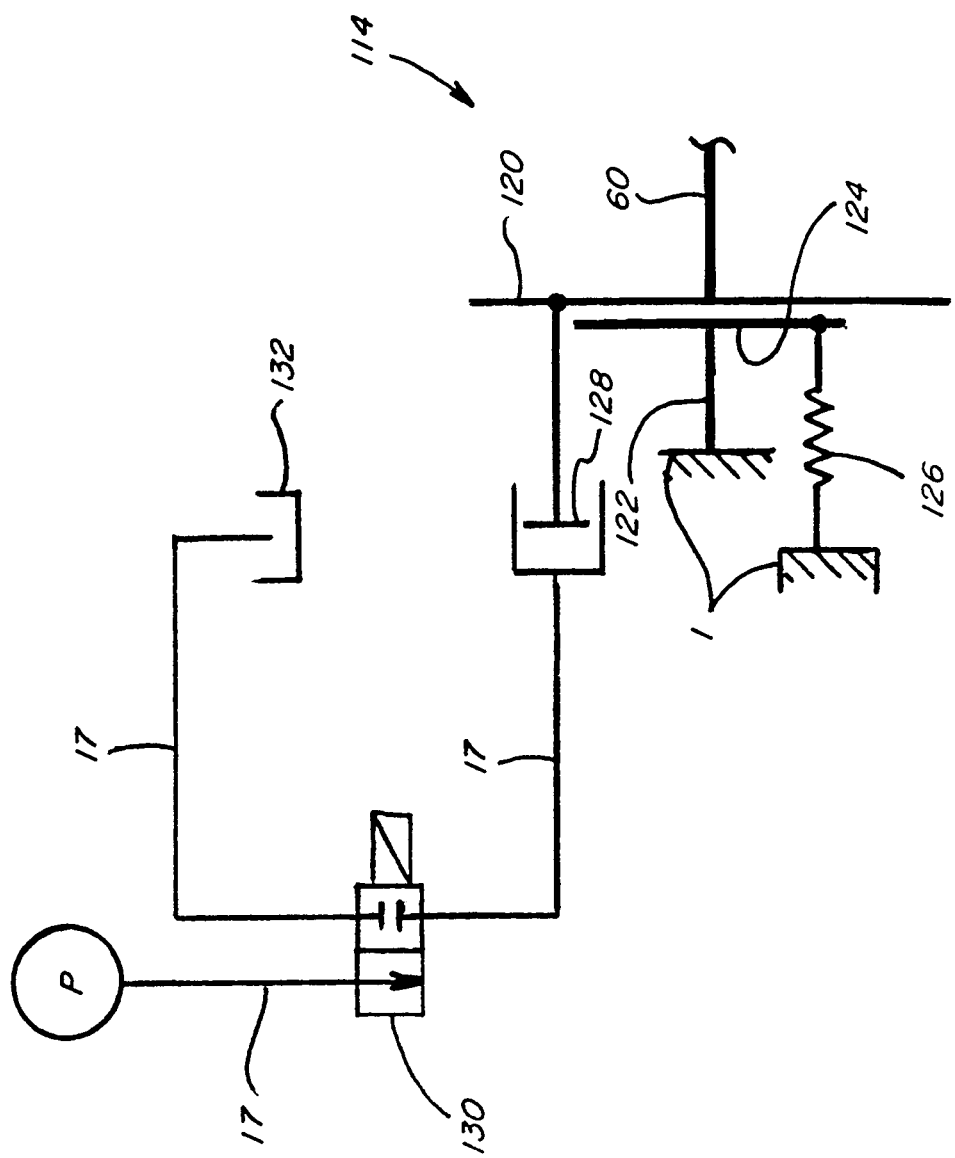
FIG. 5 is a simplified schematic view of a park brake for use with the method of the invention.

Referring more particularly to FIG. 5, park brake 114 is of conventional, well known construction. Brake 114 includes plates 120 in connection with output shaft 60, and plates 124 in connection with fixed element 122 of machine 1. Plates 120 and 124 are pressed together by a spring or springs 126 to prevent rotation of shaft 60, and are controllably movable apart by a fluid piston 128 to allow rotation of shaft 60. Pressurized fluid is supplied via fluid lines 17 from a pump P to proportional solenoid pressure reducing valve 130 operated by an electrical signal from controller 100 or other suitable control signal, to control the movement of piston 128 for controllably separating the plates 120 and 124, and flow of the fluid to a tank 132.

Figure 3:
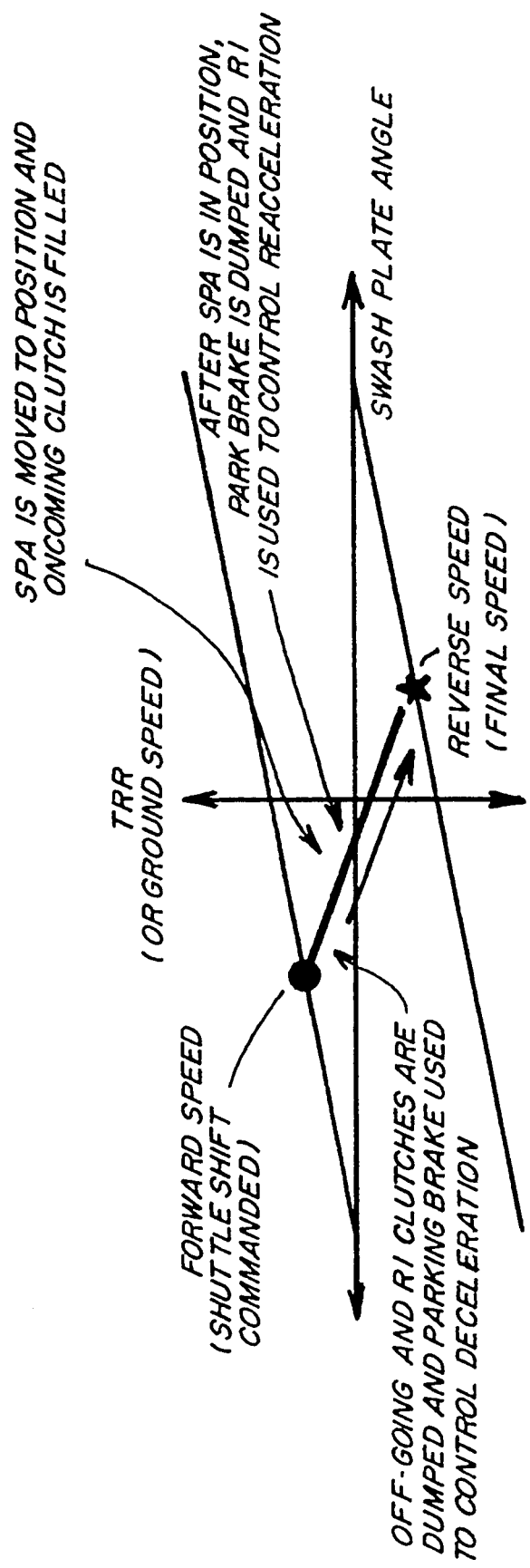
FIG. 3 is a diagrammatic representation of transmission ratio versus swash plate angle for a representative shift of the transmission.

Conditions wherein park brake 114 will be automatically controlled by controller 100 to engage, or remain engaged if already engaged, can include, but are not limited to, when power source 4 of machine 1 is turned off, the transmission is disengaged, the operator leaves the operator seat, and a time out condition wherein the operator leaves the FNR lever in F for a period of time without movement. Controller 100 will also control the park brake to remain engaged when a command is received to disengage the park brake, until certain conditions are met. Other conditions include when a command is received via an input device 102, e.g., FNR lever or the like, to change the operating state of the transmission. Such commands can include a change to, or in close proximity to, a neutral or zero movement state, or a clutch pedal command. Some shifts involve use of the park brake, as illustrated in FIG. 3.

Park brake 114 is constructed generally in the manner of a hydraulic clutch, but here is configured to operate in the opposite manner, that is, the engagement mode for a clutch would be the disengagement mode for park brake 114, and the disengagement for the clutch is the engagement of the brake.

Uses of Park Brake

Shuttle Shifting

Figure 2:
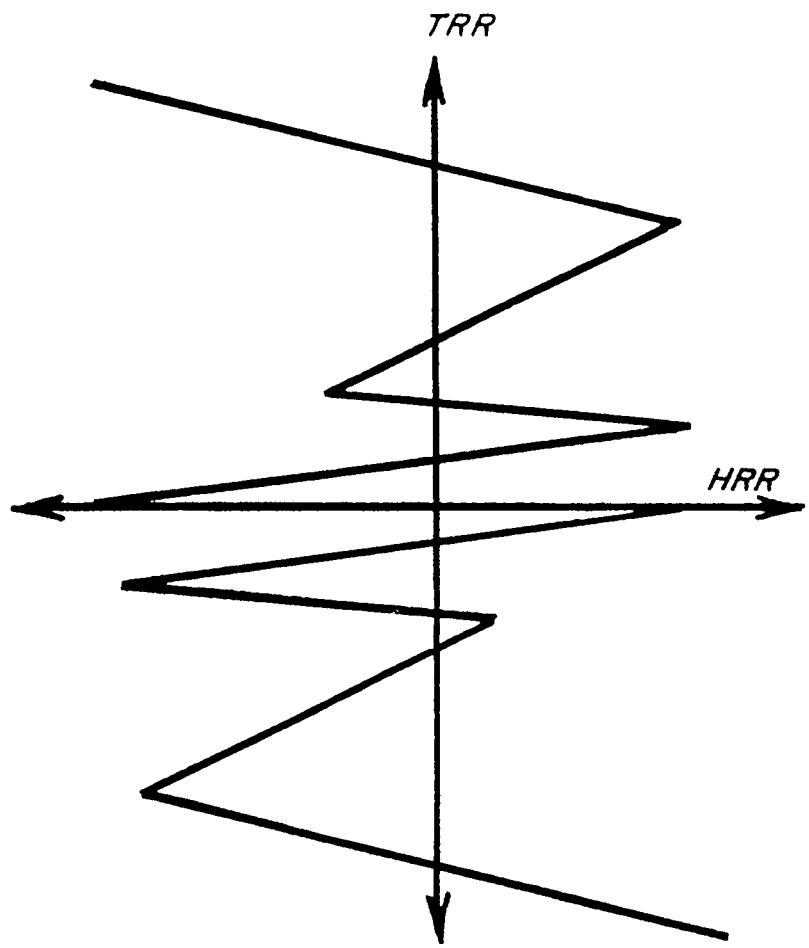
FIG. 2 is a diagrammatic representation of hydrostatic reciprocal ratio versus transmission ratio for shifts of the transmission of FIG. 1.

In order to engage reverse, not only must the directional clutches must be swapped, but the swash plate must be moved to the other side, as can be seen from the transmission diagram FIG. 1. This is true since the pump direction is not reversed. FIG. 2 also illustrates this by plotting the ratio across the HSU (HRR) verses the ratio across the transmission (TRR) for both forward and reverse.

While the swash plate is being moved from one side to the other, generally the driveline cannot be engaged, since this could result in higher speeds if the clutch is not slipped. There are perhaps two main options to deal with this, one is to four square the transmission (lock the output shaft) by applying both the R1 and R3 clutches, and the second is to use the park brake.

Shuttle shifts may have three phases. During the first, the vehicle is simply decelerated using the swashplate, shifting ranges as needed, with the deceleration limited to DTOA, the same as with any deceleration. Next is the "Directional Swap", when the forward and reverse clutches are actually swapped. Directional swapping is defined as the part of the shuttle shift from when the off-going directional clutch starts to dump to when the on-going clutch is finished ramping up and is fully engaged. The last phase of a shuttle is when the vehicle may be accelerated using the swash plate to the final speed in the opposite direction. This is again done with the swash plate, range shifting as needed, and limited to the DTOA.

Energy dissipated by clutches needs to be minimized to prevent damage. In the CVT, one of the most important ways to do this is to reduce the speed of the vehicle prior to the shift. Directional swapping is always done in the first range. If the speed is higher when the shuttle shift is commanded, the vehicle will be slowed by normal swash plate movement and range shifting.

For shuttle shifts, both the speed when the shuttle is commanded (or the current speed) and the final opposite speed will be needed to determine when and how to swap the clutches and move the swash plate. Shuttle shifting for the transmission of FIG. 1 is challenging because the swash plate may need to move a considerable distance before the oncoming clutch can be engaged, or the vehicle may go to fast before the swash plate reaches its final position. For this reason, the clutch swap will often be done at a higher speed (Constant SPA Type), but still low enough that the energies dissipated in the clutch don't cause damage (all swaps done in first range). This is not possible for lower speed shuttles, since the SPA would need to move "backwards" (reverse direction). In this case the park brake needs to be applied, to keep the vehicle from rolling while in neutral when the swash plate is being moved.

Since the time to move the swash plate may vary considerably, and engaging the on-coming clutch while the swash plate is not in position can cause over speed conditions, the logic needs to fill the oncoming clutch, and then wait until the motor speed (swash plate error) has reached it proper value before engaging the on-coming clutch to achieve consistent shifts.

During shuttle shifts, the Desired Transmission Output Acceleration (DTOA) should be achieved through all phases, and especially needs to be matched during transitions between phases. The pressure in the on-coming clutch should be carefully controlled to achieve the correct DTOA, both through initialization to the proper pressure and closed loop control. If the park brake is used for decelerations, it should also be controlled in a closed loop fashion to achieve DTOA.

Shuttle Shifts using Park Brake to Decelerate

For shuttles from lower speeds, the SPA must move backwards, and the method in the previous section cannot be used. One example is the medium to medium speed shuttle shift as illustrated in FIG. 3. Medium speed shuttles are ones where generally there is enough time to move the SPA into position before the vehicle comes to a stop, although this may not always be the case.

When the shift is initiated, there will be a slight delay as the park brake is prepared to be applied (this cannot be done in advance, since there is no ratio changing before the swap). The off-going directional clutch is dumped, since the directional swap must be performed, but the R1 clutch also must be dumped to decouple the planetary from the wheels and avoid any torque from moving the swash plate affecting the deceleration.

The park brake is then used to decelerate the vehicle while the swash plate is moved into position and the on-coming directional clutch is engaged. Engaging the on-coming directional clutch does not affect the output torque, since R1 remains disengaged. Generally, the swash plate is in position before zero speed is reached (since lower speed shuttles don't use this method), and the vehicle will not stop at zero, but this may not be the case if the SPA change is slower than normal. As soon as the swash plate is in position, the on-coming clutch is used to continue the deceleration to zero and reaccelerate in the opposite direction.

Park Brake Calibration

Park brake calibration is similar to that for a clutch, and, essentially, is determining the kiss point of a wet clutch. Since it is a brake, it is not possible to calibrate without vehicle movement. And, it is spring or otherwise mechanically applied, so the pressure must be decreased. Also, it is used to decelerate the vehicle, by decreasing the pressure in a closed loop fashion.

For the calibration, the R3 clutch and forward clutches are used to complete the path and drive. Any of the range clutches could be used, but it was found the R3 is preferred, since it results in higher HSU pressures than R1 and allows operation at lower wheel speed than R2 or R4, and should allow for the calibration to get closer to the kiss point.

To get repeatable, accurate results, it is expected that the calibration will be done on level ground, and not connected to a trailer or other setup that would make the load on the transmission vary. Exact vehicle speed required will have to be determined for a particular application, but a slow speed, such as 1 KPH, is contemplated. If the speed is too slow, the results may not be repeatable. The operator alone initiates movement in the same way as normal driving, and the all other controls such as the FNRP, service brakes, speed lever, clutch pedal, etc. can be used to stop motion, just as with normal driving.

Conditions for Park Brake Calibration

The ground speed must remain within a specified range during the calibration. If the vehicle speed is not within range for any reason, the calibration will terminate and the calibration value will not be stored.

The ground speed is automatically limited in park brake calibration to the correct value for calibration. After calibration is done, the vehicle automatically stops and cannot be moved again until calibration is exited or is performed again. The FNRP lever must also be returned to Park before the cal can be exited, to avoid the operator forgetting and to reconcile the difference between the command and park brake status.

The operator must not use the clutch pedal to take off, but either the speed lever or pedal may be used.

Initializing the calibration requires vehicle movement. Similar to engaging in normal mode, the swash plate must be in correct position before the R3 range clutch is engaged. The rate limit of the SPA is limited to avoid jerky starts or stops (especially stops, since these are automatic).

Park Brake Calibration Search Technique

In the calibration search the hydraulic brake pressure is reduced to apply the brake, since it is spring applied. A "quick empty" pulse is used, the same as when the park brake is actually applied for shuttles. Ramping is not performed after this pulse, the pressure is simply held constant, until the HSU pressure goes up, or the step times out.

After each current is tested, the brake is released again (current increased), to ensure that each step is the same as when the brake will actually be used. A "divide and conquer" approach is used. The test brake pressure is only reduced when the HSU pressure is increased. This is essentially a search routine that divides the search area in half each time it picks a new "guess". In many cases, this is the most effective search routine, using the fewest number of steps. In the present application, it is not straightforward to apply, since it is not true that the calibration current is just as likely to be in any place in the search area. It is more likely to be in the center. Therefore the routine begins with a certain step size, then it is divided in half in each successive test. This could be modified in various ways such as repeating tests to ensure the result is correct. The calibration is considered over when the step size is reduced to a sufficiently small size.

Detecting Park Brake Engagement

The pressure sensors 110 (or differential pressure transducer in the ports) of the HSU will be used as an indication of the driveline torque, for similar reasons as the clutch calibration. It is expected that there will be noise on the outputted signals of pressure sensors 110 and/or other issues with pressure fluctuations. The calibration looks for a change in the difference between the outputted pressure values of sensors 110, rather than a set level of the difference.

The operator should not use service brakes during Park Brake Calibration. Using the service brakes could cause erroneous calibration value to be stored. If service brakes need to be used, calibration should be repeated.

A more detailed description of representative transmission and vehicle with which the present invention can be used, are described and disclosed in Dix. et al, U.S. patent application Ser. No. 12/652,490, filed Jan. 5, 2010, the disclosure of which is hereby incorporated herein by reference in its entirety.

Terms

CVT—Continuously Variable Transmission
DTRR—Desired Transmission Reciprocal Ratio—command from VCL
DTOA—Desired Transmission Output_Acceleration—command from VCL
Directional Swapping—The part of the shuttle shift from when the off-going directional clutch starts to dump from when the on-going clutch is finished ramping up and SPA is in position and CTRR can again be ramped at DTOA.
CTRR—Controller Transmission Reciprocal Ratio (rate limited version of DTRR)
HRR—Hydrostatic Reciprocal Ratio (Motor Speed/Pump Speed)
HSU—Hydrostatic Unit
SPA—Swash plate Angle
TRR—Transmission Reciprocal Ratio (Transmission Output Shaft Speed/Engine Speed)
VCL—Vehicle Control Logic.

In light of all the foregoing, it should thus be apparent to those skilled in the art that there has been shown and described a novel METHOD OF CALIBRATION OF A PARK BRAKE OF A CONTINUOUSLY VARIABLE TRANSMISSION. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A method of calibrating a hydraulically operated park brake of a vehicle, comprising steps of:
   a. propelling the vehicle using the transmission, with all brakes off;
   b. monitoring a pressure condition in a hydrostatic power unit of the transmission, including recording a base pressure value in the unit;
   c. controlling the park brake in a predetermined manner using a first control signal value, and determining a resulting change in a pressure condition in the hydrostatic power unit, and:
      i. if the resulting change in the pressure condition in the hydrostatic power unit is more than a first predetermined value, then releasing the park brake and repeating steps a.-c. to control the park brake using a second control signal value expected to produce a lower resulting change in the pressure condition in the hydrostatic power unit; and
      ii. if the resulting change in the pressure condition in the hydrostatic power unit is less than a second predetermined value, then releasing the park brake and repeating steps a.-c. to control the park brake using a control signal value expected to produce a higher resulting pressure in the hydrostatic power unit; and
   d. if the resulting pressure in the hydrostatic power unit after performing steps a.-c. is between the first predetermined value and the second predetermined value, then recording the control signal value as the calibration value.

2. A method of calibrating a hydraulically operated park brake of a continuously variable transmission of a vehicle, comprising steps of:
   propelling the vehicle using the transmission, with all brakes off, and controlling hydraulic pressure in the park brake in a predetermined manner using a predetermined control value;
   characterized by monitoring a condition in a hydrostatic power unit of the transmission, for a change indicative of initial engagement of the park brake.

3. The method of claim 2, further characterized by a step of, if the change indicative of initial engagement is absent, then with the vehicle propelled using the transmission, repeating the step of reducing hydraulic pressure in the park brake in the predetermined manner to a lower value and monitoring the condition in the hydrostatic power unit of the transmission for the change indicative of initial engagement of the park brake.

4. The method of claim 2, further characterized by a step of, if the increase in the pressure condition in the hydrostatic power unit is indicative of engagement of the park brake greater than the initial engagement, then with the vehicle propelled using the transmission, repeating the step of reducing hydraulic pressure in the park brake in the predetermined manner to a higher value and monitoring the condition in the hydrostatic power unit of the transmission for the change indicative of initial engagement of the park brake.

5. The method of claim 2, wherein the condition in the hydrostatic power unit of the transmission comprises a pressure change.

6. The method of claim 5, wherein the pressure change comprises a pressure increase.

7. A method of calibrating a hydraulically operated park brake of a continuously variable transmission of a vehicle, comprising steps of:

propelling the vehicle using the transmission at a speed within a predetermined range, with all brakes off, and reducing hydraulic pressure in the park brake in a predetermined manner using a control signal having a predetermined value;

and while the vehicle is propelled at the speed, the brakes off, and the hydraulic pressure in the park brake reduced, monitoring a pressure condition in a hydrostatic power unit of the transmission, for an increase indicative of initial engagement of the park brake.

8. The method of claim 7, wherein the step of monitoring the pressure condition comprises monitoring output of at least one pressure sensor of the hydrostatic power unit.

9. The method of claim 7, wherein the step of monitoring the pressure condition comprises monitoring output of a differential pressure transducer in connection with the hydrostatic power unit.

10. The method of claim 7, wherein the control signal is an electrical current.

* * * * *